US007502747B1

(12) United States Patent
Pardo et al.

(10) Patent No.: US 7,502,747 B1
(45) Date of Patent: Mar. 10, 2009

(54) AUTOMATED JOB SCHEDULING BASED ON RESOURCE AVAILABILITY

(75) Inventors: Ehud Pardo, Bellevue, WA (US); Dan Grunspan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1127 days.

(21) Appl. No.: 09/997,616

(22) Filed: Nov. 29, 2001

(51) Int. Cl.
*G06F 9/46* (2006.01)

(52) U.S. Cl. .......................................... 705/8

(58) Field of Classification Search ...................... 705/8
See application file for complete search history.

(56) References Cited

U.S. PATENT DOCUMENTS

| 5,467,268 | A | * | 11/1995 | Sisley et al. | 705/9 |
|---|---|---|---|---|---|
| 5,671,361 | A | * | 9/1997 | Brown et al. | 705/9 |
| 5,737,728 | A | * | 4/1998 | Sisley et al. | 705/8 |
| 5,890,134 | A | * | 3/1999 | Fox | 705/9 |
| 5,913,201 | A | * | 6/1999 | Kocur | 705/9 |
| 5,943,652 | A | * | 8/1999 | Sisley et al. | 705/9 |
| 6,101,481 | A | * | 8/2000 | Miller | 705/8 |
| 6,529,877 | B1 | * | 3/2003 | Murphy et al. | 705/7 |
| 6,571,215 | B1 | * | 5/2003 | Mahapatro | 705/8 |
| 6,578,005 | B1 | * | 6/2003 | Lesaint et al. | 705/8 |
| 6,609,100 | B2 | * | 8/2003 | Smith et al. | 705/8 |
| 6,850,895 | B2 | * | 2/2005 | Brodersen et al. | 705/9 |
| 6,889,196 | B1 | * | 5/2005 | Clark | 705/9 |
| 6,944,630 | B2 | * | 9/2005 | Vos et al. | 707/104.1 |
| 7,089,193 | B2 | * | 8/2006 | Newbold | 705/9 |
| 7,149,700 | B1 | * | 12/2006 | Munoz et al. | 705/8 |
| 7,212,986 | B1 | * | 5/2007 | Richardson et al. | 705/9 |
| 7,246,075 | B1 | * | 7/2007 | Testa | 705/8 |
| 7,346,531 | B2 | * | 3/2008 | Jacobs | 705/8 |
| 7,379,888 | B1 | * | 5/2008 | Mahapatro | 705/8 |
| 2002/0035493 | A1 | * | 3/2002 | Mozayeny et al. | 705/5 |
| 2002/0065700 | A1 | * | 5/2002 | Powell et al. | 705/9 |
| 2002/0156669 | A1 | * | 10/2002 | Verhaegh et al. | 705/8 |
| 2004/0162811 | A1 | * | 8/2004 | Wetzer et al. | 707/2 |
| 2005/0027580 | A1 | * | 2/2005 | Crici et al. | 705/8 |

OTHER PUBLICATIONS

Paz, Noemi M; Leigh, William. "Maintenance scheduling: Issues, results and research needs". 1994. Journal of Operations & Production Management. vol. 14, Issue 8. pp. 47-69.*

* cited by examiner

*Primary Examiner*—Peter H Choi
(74) *Attorney, Agent, or Firm*—Workman Nydegger

(57) ABSTRACT

Each job is defined in terms of the tasks/services required to do the jobs, using resources needed to carry out those tasks/services at different times during a scheduling period. Each available resource needed for each task/service is associated with a job ID and different start times for a job, forming proposals. The proposals are preferably created prior to the time that any appointments are made to do the job. If an appointment time requested by a customer to have the job done is available among the proposals created, the appointment is scheduled using the proposal. As each appointment is scheduled, changed, or canceled, the available proposals for the job are automatically modified to reflect the changes in the time that each resource is available to do the tasks/services required for the job.

10 Claims, 13 Drawing Sheets

```
                                                          102
                                                                    APPOINTMENT MANAGER
     | HOME | APPOINTMENTS | CUSTOMERS |   TOOLS   |  SETTINGS  |
        SETTINGS: > PERSONNEL > DANIEL > PROFILE ~162            104

PERSONNEL         160                                       HELP
     ─────────────────────────────────────────────────────────────
     ENTER INFORMATION & SELECT SERVICES THE PERSON PERFORMS. A PERSON
     MUST HAVE AT LEAST ONE SERVICE TO BE SCHEDULED.
     ┌ PERSONNEL INFORMATION ─────────────────────────────────┐
     │  DISPLAY NAME:    [DAN      ]  164                     │
     │  FIRST NAME:      [DANIEL   ]  166                     │
     │  LAST NAME:       [GREEN    ]  168                     │
     │                   LEAVE PASSWORD BLANK IF YOU DO NOT WANT PERSONNEL TO
     │                   ACCESS THEIR SCHEDULES ONLINE.
     │  STOREFRONT       [******   ] 170                      │
     │  PASSWORD:                                             │
     │  RETYPE PASSWORD: [******   ] 172                      │
     │  EMAIL/PAGER                                           │
     │  ADDRESS:         [WEBAPPT@MSN.COM] 174                │
     │  DESCRIPTION:     ┌─────────────────────┐              │
     │                   │PROVIDES LIFE        │              │
     │                   │INSURANCE PHYSICALS  │              │
     │         176       │                     │              │
     │                   └─────────────────────┘              │
     ├ SUPPORTED SERVICES ────────────────────────────────────┤
     │  ☐ FLU CHECK UP                                        │
     │  ☐ FOLLOW-UP                                           │
     │  ☑ HOME VISIT  180                                     │
     │  ☐ EKG                                                 │
     │  ☐ BLOOD WORKUP           178                          │
     │  ☑ PHYSICAL  182                                       │
     │  ☐ STRESS TEST                                         │
     │  ☐ OTHER LAB WORK                                      │
     └────────────────────────────────────────────────────────┘
```

| | | | | APPOINTMENT MANAGER |
|---|---|---|---|---|
| HOME | APPOINTMENTS | CUSTOMERS | TOOLS | SETTINGS |

EDIT A SERVICE     <u>210</u>     104 <u>HELP</u>

ENTER INFORMATION ABOUT THIS SERVICE. THIS INFORMATION APPEARS ON YOUR STOREFRONT

SERVICE INFORMATION
THE NAME, DESCRIPTION, AND PRICE RANGE ARE DISPLAYED TO YOUR CUSTOMERS.
SERVICE NAME: [CHECKUP] ~212
DESCRIPTION: [GENERAL OVERALL CHECKUP] ~214
MAXIMUM 300 CHARACTERS ~216
PRICE RANGE (OPTIONAL): MINIMUM [50] TO MAXIMUM [100] ~218

LENGTH OF APPOINTMENT
TYPE THE LENGTH OF AN APPOINTMENT IN MINUTES FOR THE CUSTOMER AND FOR THE PERSON PROVIDING THE SERVICE. THE START TIME IS THE SAME FOR BOTH.
MINUTES RESERVED BY CUSTOMER: [60] ~220
MINUTES RESERVED FOR PERSON OR RESOURCE: [45] ~222

SERVICE OPTIONS
☑ DISPLAY THIS SERVICE ON MY STOREFRONT.
☐ SET THE STATUS OF ALL NEW APPOINTMENTS FOR THIS SERVICE TO PENDING.
☑ DO NOT DISPLAY PERSONNEL AND RESOURCE NAMES ON MY STOREFRONT.

224   196~[ SAVE AND CLOSE ][ DELETE ][ CANCEL ]~198

INITIAL TEMPLATE
RESOURCE A

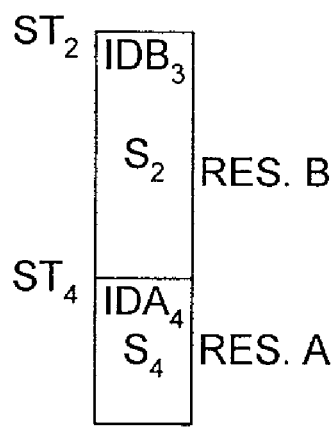 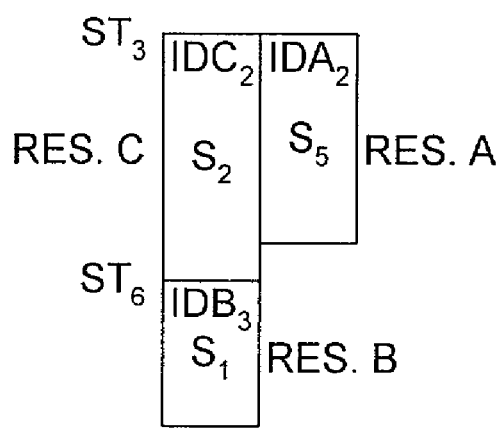
*FIG. 14A*  *FIG. 14B*

AUTOMATED JOB SCHEDULING BASED ON RESOURCE AVAILABILITY

FIELD OF THE INVENTION

This invention generally relates to automated scheduling of jobs, and more specifically, automatically scheduling appointments for a job based upon attributes of the job, resource availability, and the flow and order of time frames for each service required to do the job.

BACKGROUND OF THE INVENTION

Service providers comprise a substantial portion of the nation's economy. Most service providers perform specific jobs that are common to a specific type of business. For example, an automobile repair business might do a wide range of automotive diagnostic and repair jobs, each job including a plurality of tasks that are carried out using various resources. For example, a job referred to as "disk brake pad replacement" requires that a series of tasks be done, including: positioning a vehicle on a hydraulic hoist, removing the wheels to access the brake rotors and brake pads, removal of the brake pad assembly on each wheel, removing and turning the brake rotors (machining the rotors) to eliminate surface blemishes, remounting the brake rotors on each wheel, replacing the worn brake pads with new brake pads on each wheel, final inspection, and removing the vehicle from the hoist. To carry out this job, several mechanical resources are required. Specifically, a hydraulic hoist must be provided to lift the vehicle, and a brake rotor turning machine must be available to turn each brake rotor. In addition, personnel are required to carryout each task included in the job. Although one or more mechanics at a business might be able to do all of these tasks, it is also likely that different people might be involved in doing the job. In this example, perhaps only one mechanic out of the four employed by the automotive repair business is skilled in running the brake rotor turning machine, although three other mechanics can do all of the other tasks required for this job.

When a prospective customer schedules an appointment to bring a vehicle into the automotive repair business to have the vehicle's brake pads replaced, it is important that the customer be advised of the next available appointment, or offered alternative times to make an appointment that satisfies the requirements of the customer and does not conflict with the appointments already made that will require one or more of the same resources. A manager at the automotive repair business who schedules appointments to do a job must consider the total time required to complete each job, and the availability of physical and personnel resources required to do the job, in view of other appointments that have already been made. The problem becomes even more complex as appointments to do other jobs must be scheduled.

It will be apparent that allocating various physical and personnel resources among available times when each different job might be carried out most efficiently can result in many different combinations and can be a daunting task to perform manually. At best, manual techniques for blocking out appointments on a schedule grid are inefficient and may overlook conflicts in the scheduling of necessary resources between different jobs. As the number of jobs, tasks required per job, resources, time constraints, and the range of available times to do jobs increases, the problem becomes increasingly more complex. Clearly, a computer program that can automatically schedule appointments to make efficient use of resources would be very valuable. It would also be preferable to enable the scheduling of appointments by customers, without requiring the intervention by business personnel, e.g., over the Internet. A customer might be presented with an option of choosing from available times to have a job done on a specific day. Alternatively, the business might make use of such a computer program running as a Web application to schedule appointments in response to requests by customers who walk in or call in for an appointment. Access to the computer program for scheduling an appointment at a business should preferably be through almost any type of computing device or network access device, including a personal data assistant (PDA), an Internet accessible cell phone, or other type of communication or computing device that can couple to a network. The scheduling program should also be capable of handling changes in scheduling, such as the insertion of new jobs, changes in appointment times, and the cancellation of appointments, in a manner that provides efficient utilization of physical and personnel resources. Currently, there does not appear to be any program that can provide all of these functions in an automated and efficient manner.

SUMMARY OF THE INVENTION

The present invention addresses the problems discussed above by providing a method for scheduling appointments to do a job and is applicable to scheduling each of a plurality of different jobs performed by a business. In this method, an operator specifies each service and a time dependency of each service needed to perform the job. In addition, the operator specifies a time availability of the resources that can be used to perform each service needed to perform the job. For example, if the job is the replacement of a vehicle muffler, the resources required to do the job might include a mechanic trained to do muffler replacement work, a hydraulic lift on which the vehicle can be raised, a welding torch, and a tube bending machine for custom forming muffler pipes. The mechanics trained to do one or more of the services required for this job may be available only a portion of the normal business hours each day, so the time availability of each mechanic and of the other resources must be specified to enable scheduling of appointments to do this job. A software program that carries out the scheduling process automatically creates a plurality of proposals that specify when the job might prospectively be scheduled during a defined time period (a schedule domain), such as the normal hours in which a business is open on a specific day of the week. The proposals are created as a function of each service and the time dependency of each service specified, and as a function of the time availability of each resource that can be used to perform each service needed to do the job. Each proposal indicates a time instance at which the job can be initiated during the defined time period. The proposals are preferably created well before the job is actually scheduled, but alternatively, can be created "on the fly," to make an appointment using data previously input that define the resources and the current time availability. Based upon a time criteria that is specified, the software program automatically selects one of the plurality of proposals that was previously created to make an appointment to do the job. Furthermore, having made an appointment, the software program automatically revises the plurality of proposals that were created to take into consideration the resources used by the one that was selected in making the appointment. The software program accommodates changes in the time availability of resources that are required to perform the specific proposal that was selected when revising the proposals, since resources allocated to the proposal used for the appointment may no longer be available for other appointments. This process is repeated for each appointment that is made, so long as proposals exist that can enable the job to be done during the defined time period desired for an appointment. The proposal selected to make an appointment is thus associated with a customer for whom the job is to be done.

When automatically creating the plurality of proposals, a search is made of each of the services needed to perform the job to identify an availability of each block of time remaining for resources that can be employed to do the services required for the job, to ensure that the time is sufficient in duration to perform the services. A job identification is then associated with each block of time that is thus identified. Also, it is contemplated that a block of time can be split into pieces to define a proposal having a split time interval in which the job can be performed. For example, a proposal may provide for completing part of a job before a lunch break, and the remainder after the lunch break, or part of a service required for a job one day, and the remainder the following day.

In this method, different priorities can be assigned to at least some of the resources, so that when selecting one of the proposals to schedule the appointment, a resource assigned a lower priority is used before a resource assigned a higher priority. In addition, the step of specifying the time availability of each resource preferably includes specifying any block of time in which a resource is unavailable to perform a service during the defined time period.

When selecting one of the proposals to make an appointment, the software program can optionally attempt to balance the usage of the resources that can be employed to perform the services needed to perform the job. This approach should avoid over use of some resources and under use of others.

In some cases, a plurality of the services needed to perform the job are carried out sequentially, with a first service being completed before a second service can begin. In other cases, a plurality of the services needed to perform the job are carried out in parallel, with a first service being completed while a second service is also being done.

The method enables an appointment to be canceled or changed. In response to cancellation of an appointment, the software program automatically revises the plurality of proposals, to accommodate changes in the time availability of resources that were previously required to perform the proposal selected for the appointment that was canceled, making the resources of that proposal available for other proposals.

A preferred application of the present invention is the scheduling of jobs over a network. More specifically, the present invention can be applied in scheduling appointments over the Internet, or scheduling done online by a business that receives walk-in or call-in requests to schedule jobs. It is also contemplated that the invention can be applied to enable online customers to schedule their own appointment to have a job done.

Another aspect of the present invention is directed to a system for automating scheduling of a plurality of jobs. The system includes a memory in which data and machine instructions are stored, and a user interface through which a user input is provided. A display and a processor that is coupled to the memory are also included. The processor executes the machine instructions stored in the memory to carry out a plurality of functions, including a look-ahead procedure to develop proposals for doing each job. This procedure includes steps corresponding to the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 is a block diagram of an exemplary system for a general purpose computing device in the form of a conventional personal computer (PC) suitable for implementing the present invention;

FIGS. 1A and 1B schematically illustrate the relationship between businesses using the present invention for scheduling appointments, a scheduling server, and the customers of the businesses for whom the appointments are scheduled with the present invention;

FIG. 3 illustrates an exemplary user interface screen for defining the services that a employee is capable of performing in connection with doing a job;

FIG. 5 illustrates an exemplary user interface screen for editing a service that is required for doing a job;

Figure 11A:
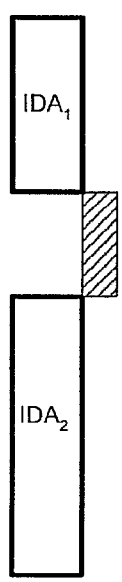
Figure 11B:
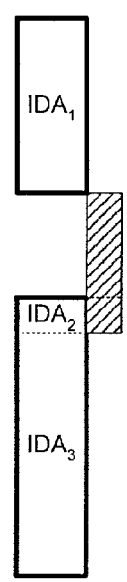
Figure 11C:
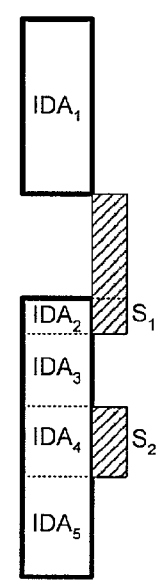
Figure 12:
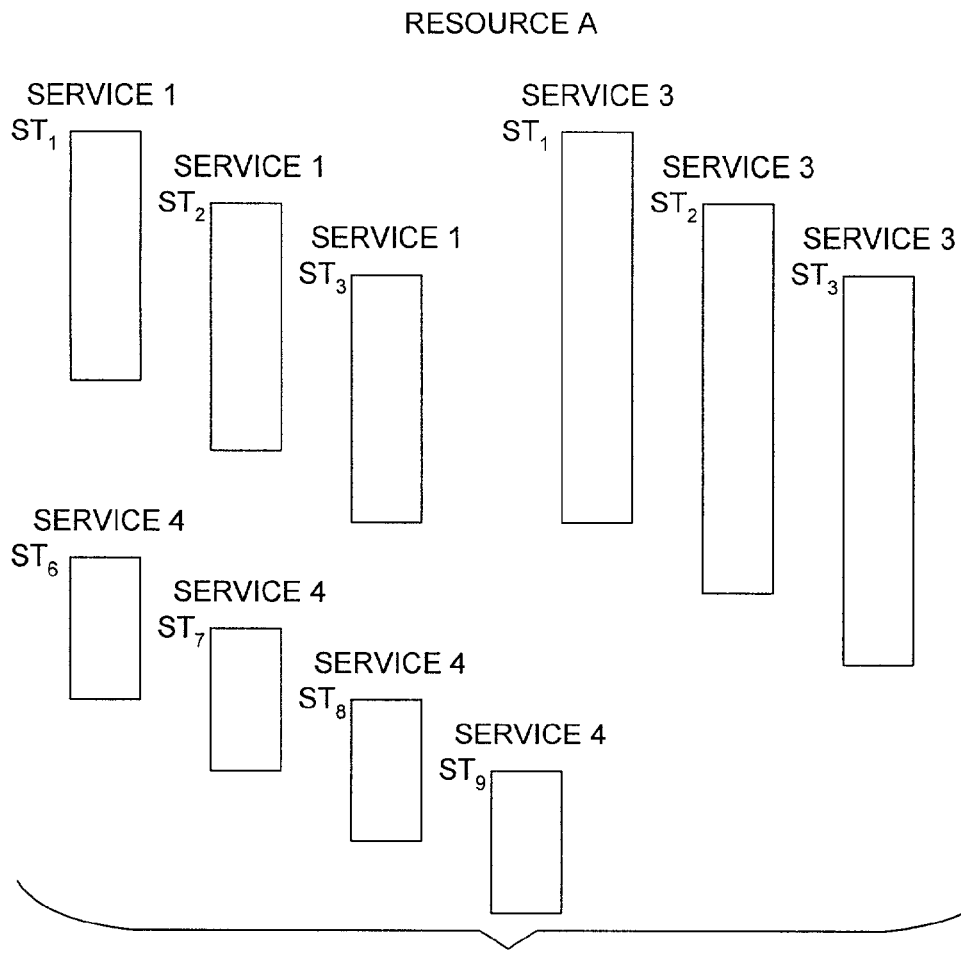
Figure 13:
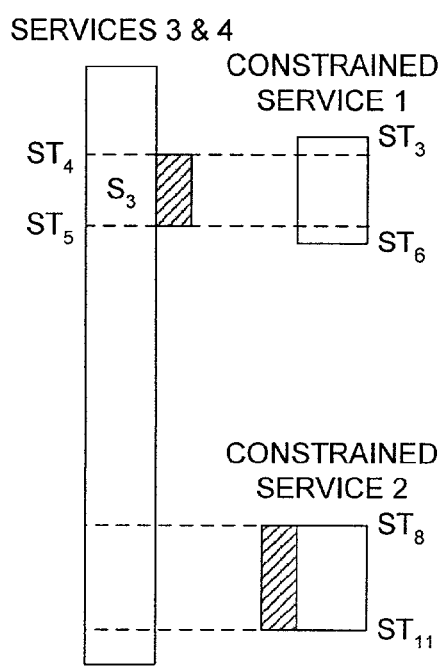

FIGS. 11A, 11B, and 11C illustrate an initial availability map template for a resource, and show the availability map as appointments are scheduled that use the resource to do a first and a second service, respectively;

FIG. 12 is a schematic diagram that illustrates a plurality of start times for different services that can be done by a resource;

FIG. 13 is a schematic diagram illustrating the availability map for constrained services and all other services that can be implemented by a resource; and FIGS. 14A and 14B are schematic block diagrams respectively illustrating a job that includes two services that are done serially, and a job that includes two services done in parallel.

DESCRIPTION OF THE PREFERRED EMBODIMENT

Exemplary Operating Environment

Figure 1:
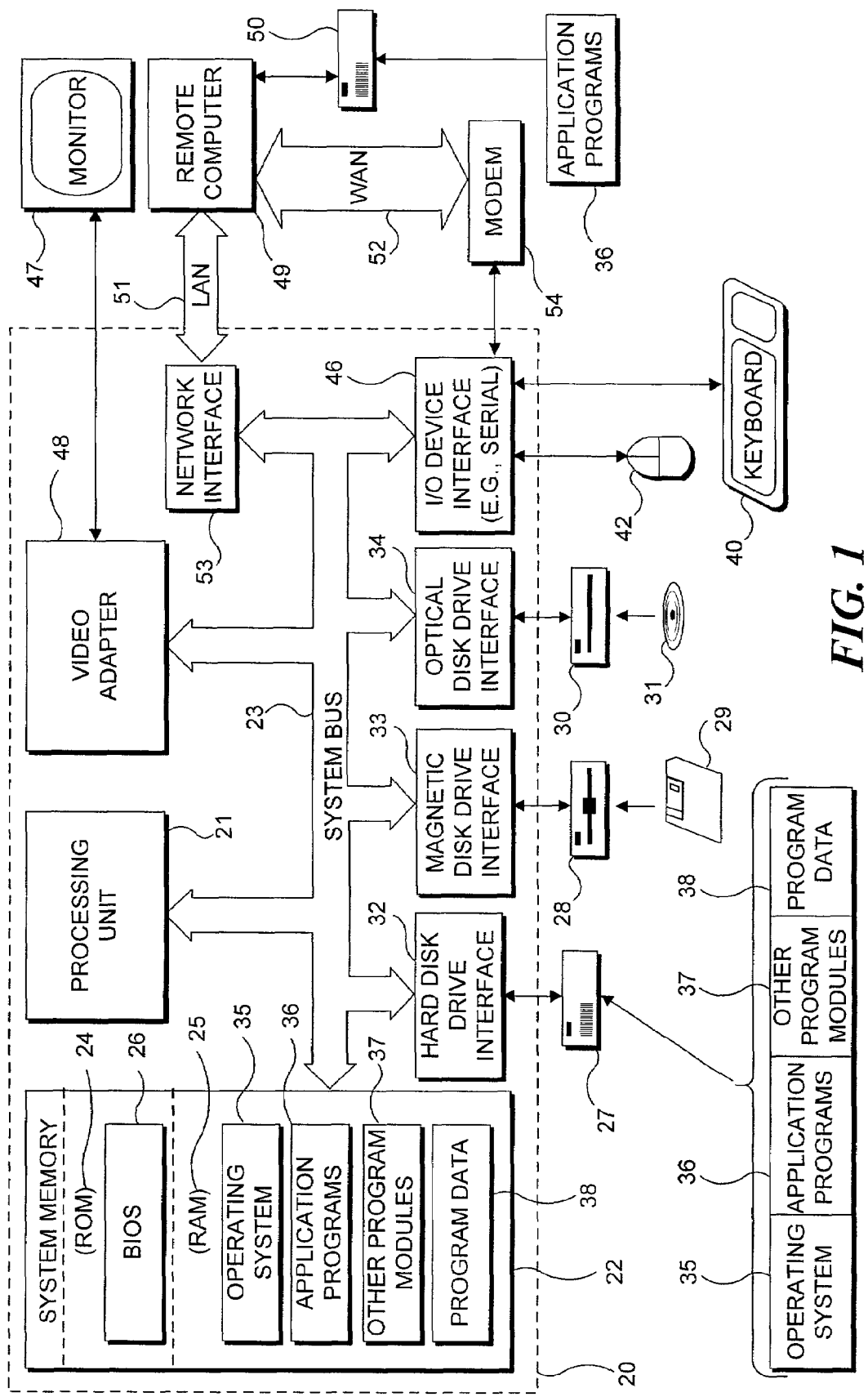

FIG. 1 and the following discussion provide a brief, general description of an exemplary computing environment that can be used for implementing the present invention. The functions for implementing the invention are defined by computer executable instructions, such as program modules, that are executed by a PC or other computing device. Generally, program modules include application programs, routines, objects, components, functions, data structures, etc. that perform particular tasks or implement particular abstract data types. Also, those skilled in the art will appreciate that in addition to PCs, this invention and access to another computing device that implements this invention may be implemented using other processing environments, such as in a client device for displaying a Web page, hand-held devices, pocket personal computing devices, digital cell phones adapted to execute application programs and to wirelessly connect to a network, other microprocessor-based or programmable consumer electronic devices, multiprocessor systems, network workstations, minicomputers, mainframe computers, and the like.

With reference to FIG. 1, an exemplary system usable to practice the present invention includes a general purpose computing device in the form of a conventional PC 20, provided with a processing unit 21, a system memory 22, and a system bus 23. PC 20 may be operated as a server on which the present invention is executed to create a plurality of proposals for making appointments, and the proposals can then be accessed over a network such as the Internet, to make appointments. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within PC 20 such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media which can store data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information such as the services required for each of a plurality of jobs, the resources required to provide each service, and the time availability of those resources into PC 20 through input devices such as a keyboard 40 and a pointing device 42. Pointing device 42 is preferably a mouse, although other types of user input devices, such as a track ball, a joystick, or a stylus can instead be used. Other input devices (not shown) for PC 20 may include a microphone, a game pad, a satellite dish, a scanner, or the like. These and other input/output (I/O) devices are often connected to processing unit 21 through an I/O device interface 46 that is coupled to system bus 23. The term I/O device interface is intended to encompass each interface specifically used for a serial port, a parallel port, a game port, a keyboard port, a PS/2 port, and/or a USB port. A monitor 47 or other type of display device is also connected to system bus 23 via an appropriate interface, such as a video adapter 48, and is usable to display application programs, Web pages, and/or other information, such as the profiles that have been created for each job that may be scheduled as an appointment. In addition to the monitor, PCs are often coupled to other peripheral output devices (not shown), such as speakers (through a sound card or other audio interface (not shown)) and printers.

PC 20 operates in a networked environment, using logical connections to one or more remote computers, such as a remote computer 49, which accesses PC 20 to facilitate scheduling an appointment for a job. Remote computer 49 may be another PC, a server (which is typically generally configured much like PC 20), a network workstation, a peer device, a PCA, a cell phone, a network connection device, or a satellite or other common network node, and may include many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and for coupling to the Internet.

When used in a LAN networking environment, PC 20 is connected to LAN 51 through a network interface or adapter 53. When used in a WAN networking environment, PC 20 typically includes a modem 54, or other means for establishing communications over WAN 52, which may include the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wideband network links.

Exemplary Application

The present invention enables appointments to be made to schedule jobs for clients or customers in real time, making effective use of different resources that are available in a company to do each type of job. To enable an appointment to be made in real time, the present invention draws upon a plurality of different proposals that have previously been created. At the time the appointment is made, it is not necessary to determine the resources that are available to do the job, since the data comprising such resources will already have been produced. Instead, an appointment is made by selecting one of the proposals that satisfies the customer in terms of a starting time on a given day or date. It is also contemplated that the present invention can be implemented using the data input for the resources to enable an appointment for a new job to be created "on the fly," i.e., in real time.

A preferred embodiment of the present invention is described below in connection with its use on Microsoft Corporation's bCentral™ Web site, to provide an appointment manager and scheduling services for businesses that use the various services provided by the site. Typically, a business will use the appointment manager on the business' bCentral Web page when creating proposals for each job performed by the business during its normal business hours, or at specific days of the week/month. Once the proposals have been created, the appointment manager at the bCentral site can then be used by customers of the business for making appointments, or can be used by the business to make appointments for customers or clients who walk in to the business or call in, or send an email requesting an appointment. Accordingly, there is a substantial latitude in the way that the appointments can be made once the proposals for each job have been created. Also, although not currently done, it is contemplated that once the data for each resource have been input, appointments for a new job might be made using that data. Further, changes in appointments are facilitated using the present invention. The resources previously scheduled for an appointment that is either canceled or changed to a different day and/or time are released so that they are available for other new appointments.

Figure 1A:
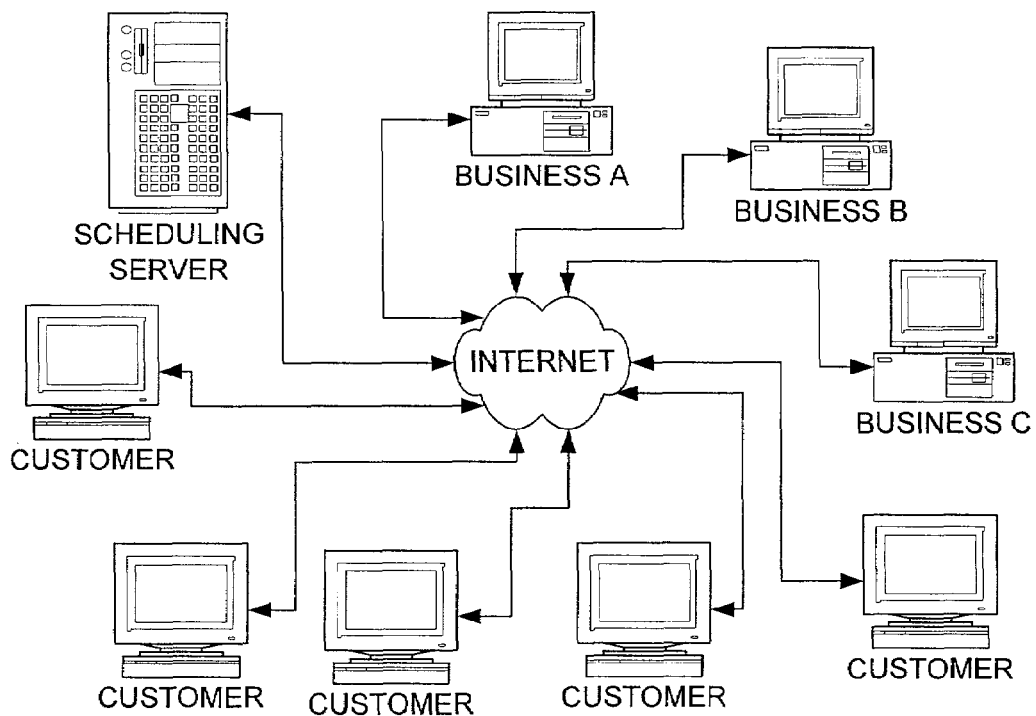
Figure 1B:
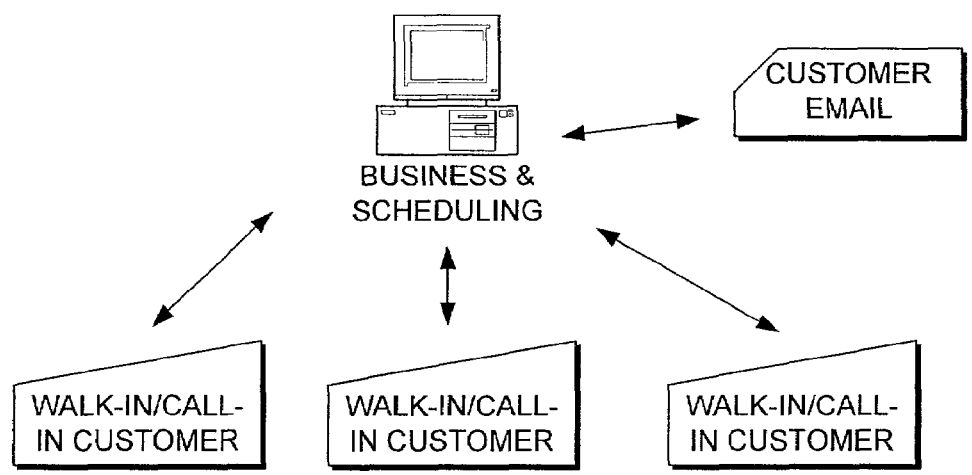

FIGS. 1A and 1B illustrate an exemplary relationship between businesses A, B, and C and a plurality of customers of those businesses in connection with the present invention. In this example, a scheduling server (e.g., at the bCentral Web site) stores the data for each of the jobs created by these businesses, each job having associated with it a plurality of proposals created during the look-ahead or during subsequent modifications to the proposals caused by making appointments, and/or changing or canceling appointments. The customers are coupled to the scheduling server through the Internet and access a Web page for a selected business through Microsoft Corporation's bCentral Web application program, which handles automated scheduling of jobs. Thus, any customer can use the present invention to schedule an appointment through the web site provided for a selected business. Also, the business can schedule appointments using the data on the scheduling server in response to walk-in, call-in or email requests by customers, generally as indicated in FIG. 1B.

DEFINITION OF TERMS

The following terms are used throughout the explanation of a preferred embodiment of the present invention and the definitions of these terms provided below should facilitate an understanding of how the invention operates.

Appointment—a proposal that has been scheduled by a user or a provider.

Balance of Resource Use—an action invoked as part of a rule which selects a random resource having a LRAB or a CRAB containing the required task, task start time, and highest priority among all available resources when more than one resource having these qualities is available. This action can be modified by multiplying the priority of a resource by a weighted random number to obtain a modified priority for that resource when evaluating this action.

Constrained Resource Availability Block (CRAB)—a continuous period of time within the schedule domain over which a resource, $R_x$, is only available to perform the task or service associated with it. There are zero or more CRABs for each resource. A resource number, task or service, a specific start time, and a specific stop time define each CRAB.

First Available—an action invoked as part of a rule that selects the first resource encountered when performing look-ahead having a LRAB or a CRAB containing the required task, task start time, and highest priority among all available resources when more than one resource having these qualities is available. This action can be modified by multiplying the priority of a resource by a weighted random number to obtain a modified priority for that resource when evaluating this action.

Job—a multiplicity of tasks performed by one or more resources according to the instructions provided in a rule.

Job Scheduling Manager (JSM)—the software program, which is executed on a server hosting a business Web page within Microsoft Corporation's bCentral's Web site in a preferred embodiment, used to create proposals and to schedule jobs to be done by the business in accord with the present invention.

Job Start Time—the time a job can be initiated.

Job Start Time List—a list of job start times for a given job within the schedule domain. This list may be input by the provider or generated by the JSM using a rule.

Job-Time—a job associated with its start time.

Linear Resource Availability Block (LRAB)—a continuous period of time within the schedule domain in which a resource, $R_x$, is available to perform any service $S_y$, or task $T_y$, associated with it. There are zero or more LRABs for each resource. A resource number, a start time, and a stop time define each LRAB.

Look-Ahead—the act of predetermining a schedule path that identifies a set of proposals, i.e., resources-task-times, which fulfill a job's rule.

Output—a report containing the list of available proposals.

Priority—a number that represents the importance of a given resource performing a given task at a given time relative to other resources that are able to perform the same task at the same time.

Proposal—a schedule path that identifies the resource-task-Ttme sequence that logically satisfies the rules associated with a job-time. A proposal is defined by the resource-task-time tags associated with it.

Provider—an entity (human or machine) that defines resources, tasks, jobs, rules, task priority, task duration, LRABs, CRABs, RUBs, etc., for input to the JSM.

Resource—an entity (human, machine or a combination of both) able to perform one or more types of tasks. The types of tasks a resource is able to perform are associated with it along with the time each task can be performed.

Resource Priority—an ordering of resources representing the merit of the use of each. A lower priority resource is selected over a higher priority resource; i.e., a lower priority resource is scheduled before and higher priority resource, wherein they are otherwise equal: each can perform a required task and has a LRAB or CRAB with an identically available task start time.

Resource-Task-Time—a unique combination of a resource having the capability to perform a specific task at a specific time.

Resource-Task-Time Tag—means for identifying a resource, a task, and a task start time used by a job.

Resource Unavailability Block (RUB)—a continuous period of time within the schedule domain over which a resource, $R_x$, is not available: i.e., time periods wherein the resource is "not working," on break, on vacation, associated with an appointment, etc.

Rule—a logical statement that defines a sequence and time relationship of a set of tasks or services required to do a job.

Schedule Domain—the continuous time period between first possible time a job may be scheduled and the last possible time a job may be finished.

Set of Resources—a number of resources organized in a numbered set $R_x$, $1 \leq x \leq a$, where "a" is a positive integer and "x" represents the organization number of the resource.

Set of Services or Tasks—a number of tasks organized in a numbered set $T_y$, $1 \leq y \leq b$ where "b" is a positive integer and "y" represents the organization number of the task.

Service—synonymous with task—a type of work performed by a resource; a resource may perform more than one type of work.

Task—synonymous with Service—a type of work performed by a resource; a resource may perform more than one type of work.

Task or Service Duration—the amount of time required to perform a task or service.

Task or Service Start Time—the time a task or service can be initiated.

Template—predefined task-times for a resource, indicating when the resource is available for creating proposals.

User—an entity (human or machine) that requests the JSM to schedule a specified appointment.

Creating Proposals Using Resources Required to do a Job

To make use of the present invention, a provider designated for the business that will do the jobs that are to be scheduled must input information necessary to generate the proposals that enable an appointment schedule to be produced by the JSM. Although in much of the following discussion only a single job is discussed, it should be understood that a typical provider for a business will input initial conditions for a plurality of jobs, some of which may be identical. The initial conditions will include data specifying job duration and times, the services required to do the jobs, and the resources (including personnel) required to implement the services. Once the initial conditions have been specified according to the data input by the provider, each job that is specified is analyzed according to one or more rules associated with it. Each rule defines a resource-task-time, and any priority related to the resources available to do one or more services required for the job. The proposal is created by associating resource-task-time tags with the job-time, which is then marked as available. Any job-time for which no proposal can be generated is marked as unavailable. The provider may stipulate that prospective job start times extend from the time a business opens through a time prior to the end of work performed at the business in the day, where the time prior depends upon the time needed to complete the job. The prospective job start times may be spaced apart by predefined increments as defined by the rule associated with the job, for example, at thirty minute increments.

During the look-ahead operation, an attempt is made to generate a proposal at each job-time in the job start time list. However, a job-time proposal will not be generated if its rule cannot be satisfied using available resource-task-time combinations. The available resource-task-times for a job are defined by the templates and by the LRABs and CRABs associated with the resources required to provide the services necessary to do each job.

When creating the proposals, each proposal is enabled to use any available resource-task-time, regardless of whether that resource-task-time has been included in another proposal. A resource-task-time is not available if it has been scheduled as an appointment. Accordingly, it will be apparent that the same resource may be proposed to perform a task at different task-times, since it is only a proposal and has not yet been associated with a scheduled appointment. When the initial look-ahead is implemented to initially create a set of proposals for a job during a specific schedule domain, no appointments have yet been scheduled so that the proposals that are generated are all prospectively available until association of a proposal with a scheduled appointment and customer causes certain of the resource-task-times previously used to create the other proposals to be unavailable. Thus, each time an appointment is made, it is likely that a plurality of proposals will be eliminated from the available set that was originally created.

When an appointment is made, an available proposal that meets the required job-time is converted to the appointment. Tags for the corresponding resource-task-time of that proposal are then associated with the appointment and the job-time is marked as unavailable for scheduling any other appointment using the proposal and the resource-task-times included in it. The time associated with the resource-task-time of the appointment is then indicated as being in a RUB, or a new RUB is created to contain this time for the resource. Once an appointment has been scheduled, other job-times using the same resource-task-time tags that are associated with the newly scheduled appointment are identified and new proposals for these job-times are recalculated, if possible. Any job-time for which no new proposal can be generated is marked as unavailable, for subsequent use if an appointment is changed or canceled.

A user may cancel an appointment once it has been established. Cancellation of an appointment releases the resource-task-time tags that are associated with the appointment. In addition, the time that has been associated with the resource-task-time of the canceled appointment is moved from its position in the RUB to the LRAB or CRAB of the resource. To maintain efficient use of resources, a complete initialization sequence is then performed to reassign the resource-task-time tags that were unassigned as a result of the appointment previously being made, which caused these tags to be noted as not available. Similarly, when an appointment is changed to a different time, the change is carried out by canceling the original appointment, and then making the new appointment at the different desired time, using a proposal that is available for that start time.

User Interface

Figure 2:
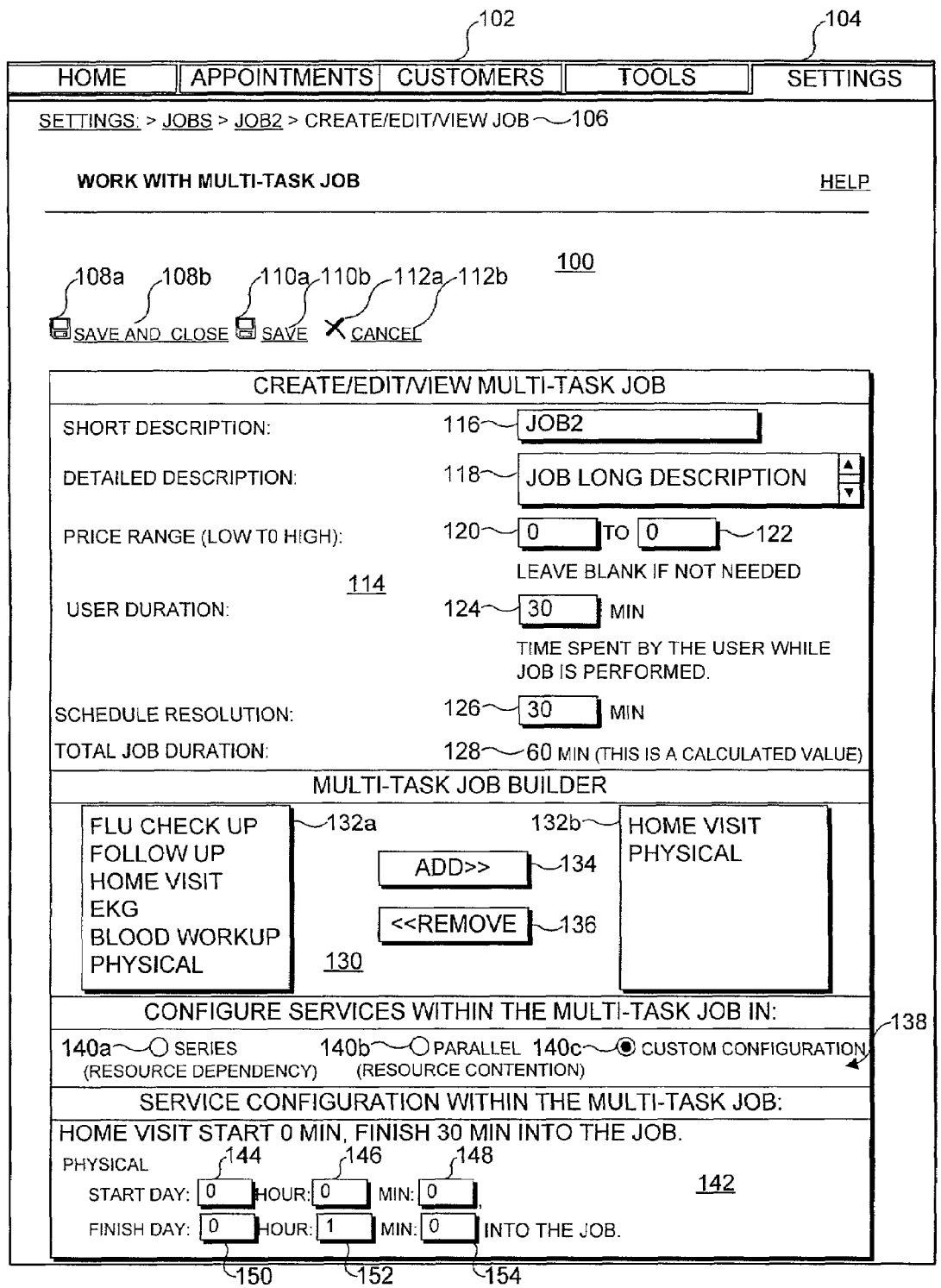
FIG. 2 illustrates an exemplary user interface screen for creating, editing, and/or viewing a job that will be scheduled using the present invention.

FIG. 2 illustrates a user interface provided for creating, editing, and viewing a multitask job to enable the present invention to create a plurality of proposals for scheduling the job. A menu bar 102 at the top of the user interface includes a plurality of options identified by tabs, and currently, a tab 104 labeled "settings" is selected. As indicated in a line 106, the provider has initiated the description of a job, specifically a job entitled "Job2" and is in the process of defining the job using the facilities of this user interface. A region 100 on the user interface includes a plurality of icons that can be selected, including an icon 108a and related text 108b for saving and closing the user interface, an icon 110a and related text 110b for saving the data in the user interface, and an icon 112a and related text 112b that provide for canceling and discarding any data entered into the user interface.

A region 114 has a plurality of text boxes, including a text box 116 (which includes the name "Job2") for entry of a short description of the job, a text box 118 for entry of a detailed description, numeric text entry boxes 120 and 122 for entering a low to high price range for the job, a user duration text box 124 in which the time in minutes is entered (corresponding to the time that the provider would wait while the job is being performed), and a schedule resolution box 126 in which the time in minutes is entered to indicate the increments in which the schedule is resolved. A line 128 defines the total job duration in minutes and is calculated by totaling the values in text boxes 124 and 126.

A multitask job builder window 130 displays a plurality of tasks in a window 132a, enabling a provider to select one or more of the tasks that are listed and activate an add control 134 to move the selected task into a window 132b that lists each of the tasks or services required to do the job. In the example shown, two tasks have been included in window 132b related to a service provided by a physician to carry out Job2. Alternatively, one or more tasks listed in window 132b can be selected, and a control 136 can be activated to remove the task from the window. The provider has the option to select a radio control 140a to indicate that the services within the multitask job being defined are to be done in series, or a radio control 140b to indicate that they are to be done in parallel, or a radio control 140c to indicate that a custom configuration will be employed. In the example shown, radio control 140c has been selected, enabling the provider to enter additional data in a service configuration window 138. This window includes text boxes 144, 146, and 148 for indicating a start day, an hour, and minute at which the selected task in window 132b is started, and text boxes 150, 152, and 154 indicating a finish day, an hour, and a minute into the job, at which the selected task will be completed. The data entered in region 142 thus define the custom configuration.

Turning now to FIG. 3, under settings tab 104, data for a specific person comprising one of the resources available to do a job is input on a personnel data sheet 160. The data that are input correspond to a profile 162 for a specific employee "Daniel" in this example. A text box 164 is provided to indicate the person's displayed name "Dan." Text boxes 166 and 168 enable the provider to enter the first and last name for the person. To enable personnel to access their schedules online, text boxes 170 and 172 are provided for entry of a storefront password and to input the password as confirmation. A text box 174 enables entry of an email/pager address for the person.

Perhaps more important, the services performed by the person are indicated in a description text box 176. In this example, the person for whom data are being input is indicated as providing life insurance physicals. More specifically in a region 178 of the user interface, the services supported by this person are indicated with check boxes. In the example shown, check boxes 180 and 182 are selected, indicating that this person does "home visits" and "physicals."

Figure 4:
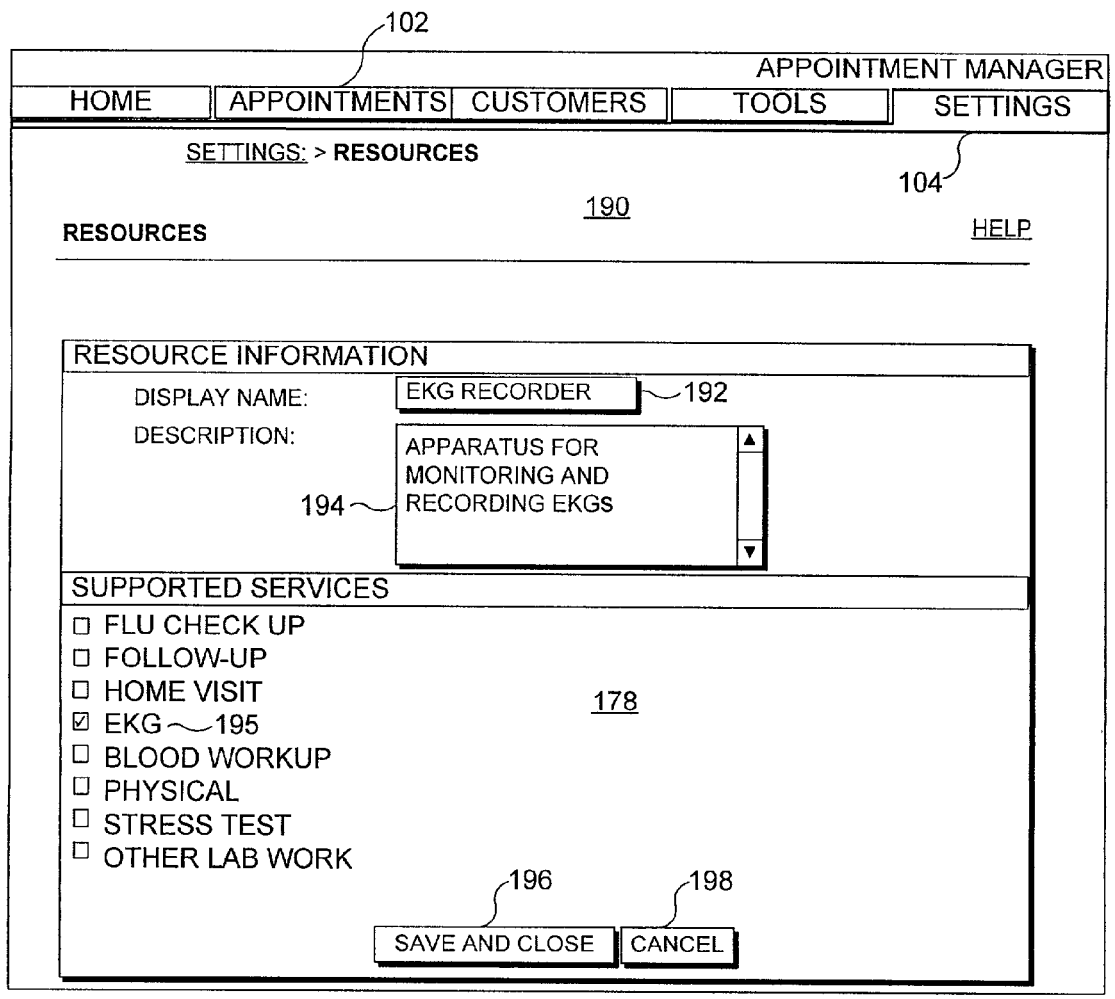
FIG. 4 illustrates an exemplary user interface screen for listing the services that a resource supports.

In FIG. 4, the settings tab is again accessed for input of data concerning other resources via a resources data sheet 190. In a text block 192 provided for entry of a display name for the resource, the text "EKG RECORDER" has been entered as an example. A text block 194 is used for entering additional details about the resource, which in this example indicates that it is used for monitoring and recording EKGs. Region 178 of the user interface includes a plurality of different services that are supported by the resource. In this case, a check box 195 labeled "EKG" has been checked to indicate that this resource is used in monitoring and recording an EKG of a patient. Controls 196 and 198 are included for saving and closing the user interface and canceling the data input during a current session, respectively.

FIG. 5 illustrates an exemplary user interface 210 for editing the data defining a task or service. In defining a service, a service name is entered in a text box 212. In addition, a description of the service is provided in a text box 214. The text entered within text boxes 212 and 214 is displayed to a customer who is making an appointment online or to the business person who is making an appointment in response to a request received by email or from a walk-in, or call-in customer. Text boxes 216 and 218 are included for entry of a minimum and a maximum price, but the entries in these text boxes are optional. If a fixed price is assigned to the service, it is entered in text box 216.

The provider specifies the length of an appointment by the number of minutes entered within a text box 220. Text boxes 220 and 222, respectively, enable entry of the number of minutes reserved for the customer to receive the service during the appointment, and the number of minutes reserved for the person or resource providing the service to the customer. In each case, it is assumed that the start time is the same for both the customer and the person or resource providing the service. The provider can also select among several check boxes that define service options. For example, check box 224 has been selected in the figure to indicate that the provider does not wish to display personnel and resource names on the storefront (i.e., the Web page for the business). Other options enable the provider to display the service on the storefront and to set the status of all new appointments for the service to "pending." Once the data have been entered, the provider can select either control 196 to save and close the user interface, or control 198 to cancel the transaction. Alternatively, a control 226 can be selected to delete a current entry on the user interface.

Details of the Logic Used in the Present Invention

Figure 6:
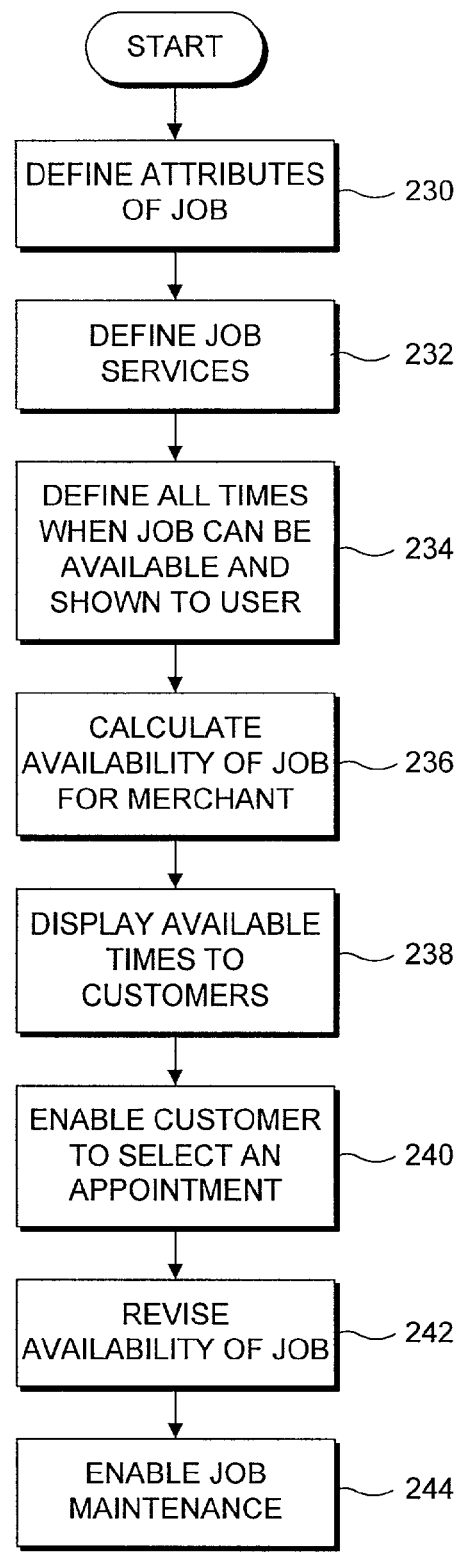
FIG. 6 is an overview flowchart showing the logical steps implemented by the present invention.

With reference to FIG. 6, the steps implemented in carrying out the present invention are illustrated in a flow chart format. After a start block, a step 230 provides for defining attributes of a job. As noted above, this step is carried out by the business or provider and is done for each of the jobs for which proposals are to be generated to facilitate scheduling appointments. During this step, the provider supplies the data that define the job, including the resources that are required, the tasks or services that must be done to implement the job, the schedule domain in which the provisions for the job should be created, and the resource templates, the LRABs, and the CRABs for each resource available to do the job.

Next, in a step 232, the provider defines the job services or tasks that must be carried out to do the job. A step 234 enables the provider to define all the times when the job is available to be done that can be shown to the user (or customer) who will be making an appointment to have the job done. These times are always within the start and end times of the schedule domain and can be established as predefined increments based upon the rule for the job.

In a step 236, the program automatically determines or calculates the availability of a job for the business. This step corresponds to the look-ahead action used to initialize the job-time data that create a plurality of proposals satisfying the rule regarding resource-task-times, and priority. During step 236, the resource-task-time tags are associated with each job-time for each different proposal that is created. After the calculation in step 236 has been completed, a step 238 provides for displaying the available times to customers or to the user at a business who will be employing the proposals that have been created for making appointments. The proposals can be displayed over a network, or over the Internet or other type of wide area network, using a browser program, to facilitate making an appointment by selecting one of the proposals corresponding to a desired time for the appointment to do a job. As noted above, the appointments can be made by the business in response to an email, or to walk-in or telephone call requests by a customer to schedule an appointment, or alternatively, can be made directly by a customer, as indicated in a step 240.

Following a selection of a proposal to schedule an appointment for a customer, the resource-task-time tags for the selected proposal are associated with the appointment, causing the job-time to be marked as unavailable for other appointments. In a step 242, the time associated with the resource-task-time of the appointment is moved into a RUB, and the availability of other proposals for doing the job are revised.

Finally, in a step 244, the provider, or customer, is enabled to perform job maintenance, including canceling an appointment, or changing an appointment. In addition, the provider can modify the data used to create the proposals. Any time that the data that were used to define the proposals for a job are modified, it will be necessary to recreate the proposals for that job with the new data.

Figure 7:
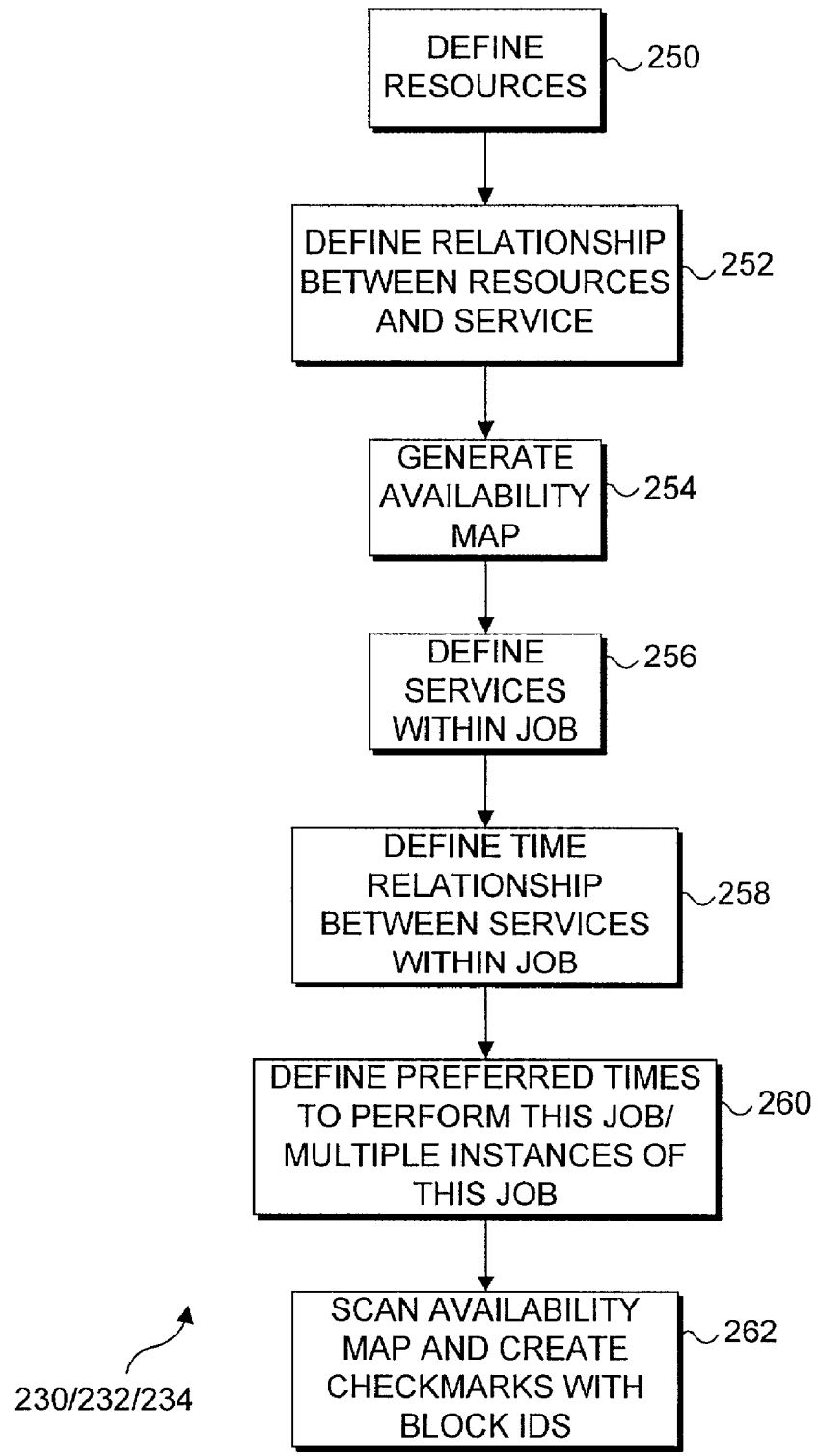
FIG. 7 is a flowchart showing details of the logical steps implemented to define resources and other data used to produce an availability map for scheduling a job.

Further details of step 230, 232, and 234 are indicated in FIG. 7. In a step 250, the business provider defines the resources that are required to perform each task in the job. As indicated in a step 252, the provider must define the relationship between the resources and the service task being performed to do the job. It should be noted that resources can be either personnel, physical devices, components, or tools. For example, if the job being defined is the replacement of a muffler on a vehicle, one of the resources might be the hydraulic lift used to raise the vehicle to access the muffler system under the vehicle. Accordingly, to perform this job, it is likely that hydraulic lift will be required throughout the majority of the time that job is being performed.

In a step 254, for each resource that is required to perform each task or service needed to do the job, an availability map is generated. The availability map is developed from a template for a resource and indicates the times that the resource is available during the schedule domain to perform a task or service with which it is associated. The availability map indicates zero or more CRABs for each resource, as well as zero or more LRABs for each resource. Examples of availability maps are described below.

In a step 256, the user defines the services within the job. Certain jobs require that one or more services be carried out in a serial fashion, while other jobs can be done with services or tasks that are carried out in parallel. Accordingly, this step insures that the services or tasks required to do the job are defined in connection with any order that they must be performed if done serially or in a combination of serial and parallel sequences. For example, if the job is replacing the disc brakes on a vehicle, the first task that must be done is to raise the vehicle on a hydraulic lift, followed by removing the wheels and the worn brake pads from the vehicle. Once the brake pads have been removed, the next task may be removing and turning the disc rotors if the rotors are worn sufficiently to require that task to be done. Thus, these two tasks must be scheduled in sequence and the rotor turning machine is a resource that used only after the rotors have been removed from the vehicle.

In part, the definition of services within the job also requires that the time relationship between the services for the job be defined as indicated in a step 258. In the example noted above, a time equal to 30 minutes might be required to perform the first task, while the second task might require 45 minutes. Yet a third task involving the installation of new disc brake pads and the replacement of the wheels would also be scheduled, requiring yet another 40 minutes to complete the job.

In a step 260, the user is given the option of defining preferred times to perform this job and also to indicate whether multiple instances of the job can occur at one time. In many cases, assuming that sufficient resources are available, it will be possible to perform multiple instances of a given job. However, for example, if only a single brake rotor turning machine is available, that resource cannot be scheduled at the same time block in two different jobs.

In a step 262, the program automatically scans the availability map and indicates the time block IDs to specify the resource-task-time for each proposal in which the job can be implemented.

Figure 8:
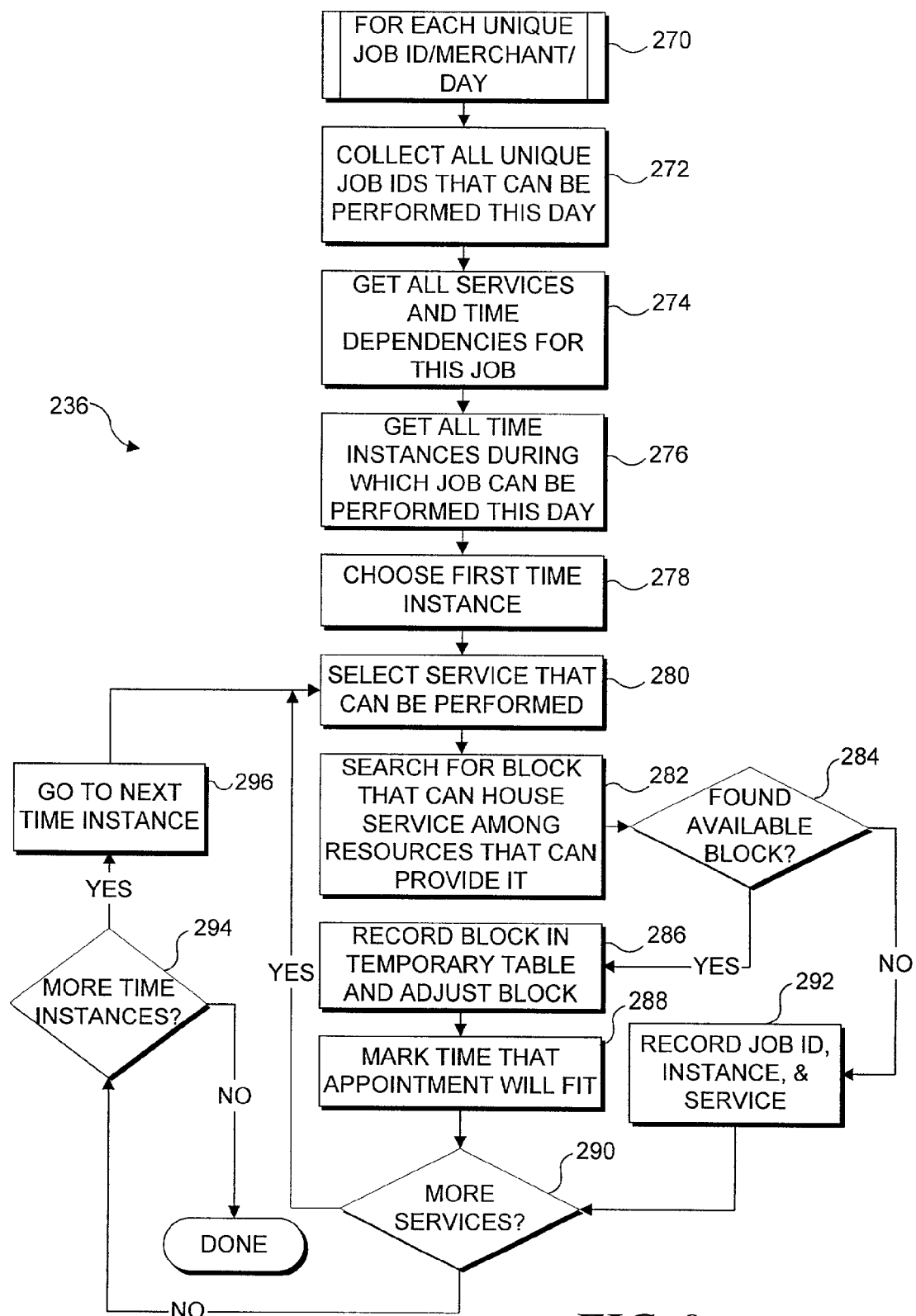
FIG. 8 is a flowchart showing details of the logical steps implemented by the present invention to create the proposals for each job.

Details for creating the proposals are illustrated in FIG. 8, beginning with a step 270, which provides that for each unique job, business, and day, the following steps are implemented to create a plurality of proposals. First, in a step 272, the software program automatically collects all unique job IDs that can be performed in this day. Next, in a step 274, the software program identifies all services and time dependencies for the current job. Associated with this step is a step 276 in which the program gets all time instances during which the job can be performed for the day in which proposals are being created.

In a step 278, the software program chooses the first time instance. When supplying the data necessary to enable the software program to create proposals, the user will have indicated each of the prospective start times for the job during the day. Thus, in step 278, the program will choose the first time instance thus indicated. Next, in a step 280, the software program selects the service that must initially be performed beginning with the first time instance. As noted in a step 282, the program searches for a time block in an availability map for a resource that can house the service among all of the resources that can provide it. Each resource can be assigned a priority, so that in selecting a resource to do a task, the program will use a resource with a lower priority before one with a higher priority. Also, the program will attempt to create proposals using different resources to achieve load balancing, if possible. In a decision block 284, the software program determines if an available block has been found. If so, a step 286 records the time block identification in a temporary table and indicates the offset for this block in the table, along with the appropriate service that can be performed in this time block.

Next, in a step 288, the program marks the time that an appointment using the proposal will fit. This step associates the tag for the services, and resources to the time of the appointment. A decision step 290 then determines if there are any more services to be processed. If so, the logic returns to step 280 to select the next service that will be performed.

Referring back to decision step 284, if an available time block is not found, a step 292 provides for recording the job ID, instance, and service for which an available block of time is not found. This record can then be used in the event that resources are freed if an appointment is canceled or changed. The logic then returns to decision step 290.

If there are no more services to be performed in decision step 290, the logic continues with a decision step 294, which determines if there are any more time instances to be processed. If not, the processing is completed. However, if more time instances remain to be processed, the logic proceeds to a step 296, which undertakes the processing of the next time instance. Each time instance in the domain schedule (e.g., a day in which proposals for a job are being created) is processed until no further time instances exist during the schedule domain. At that point, the step of creating proposals is completed.

Figure 9:
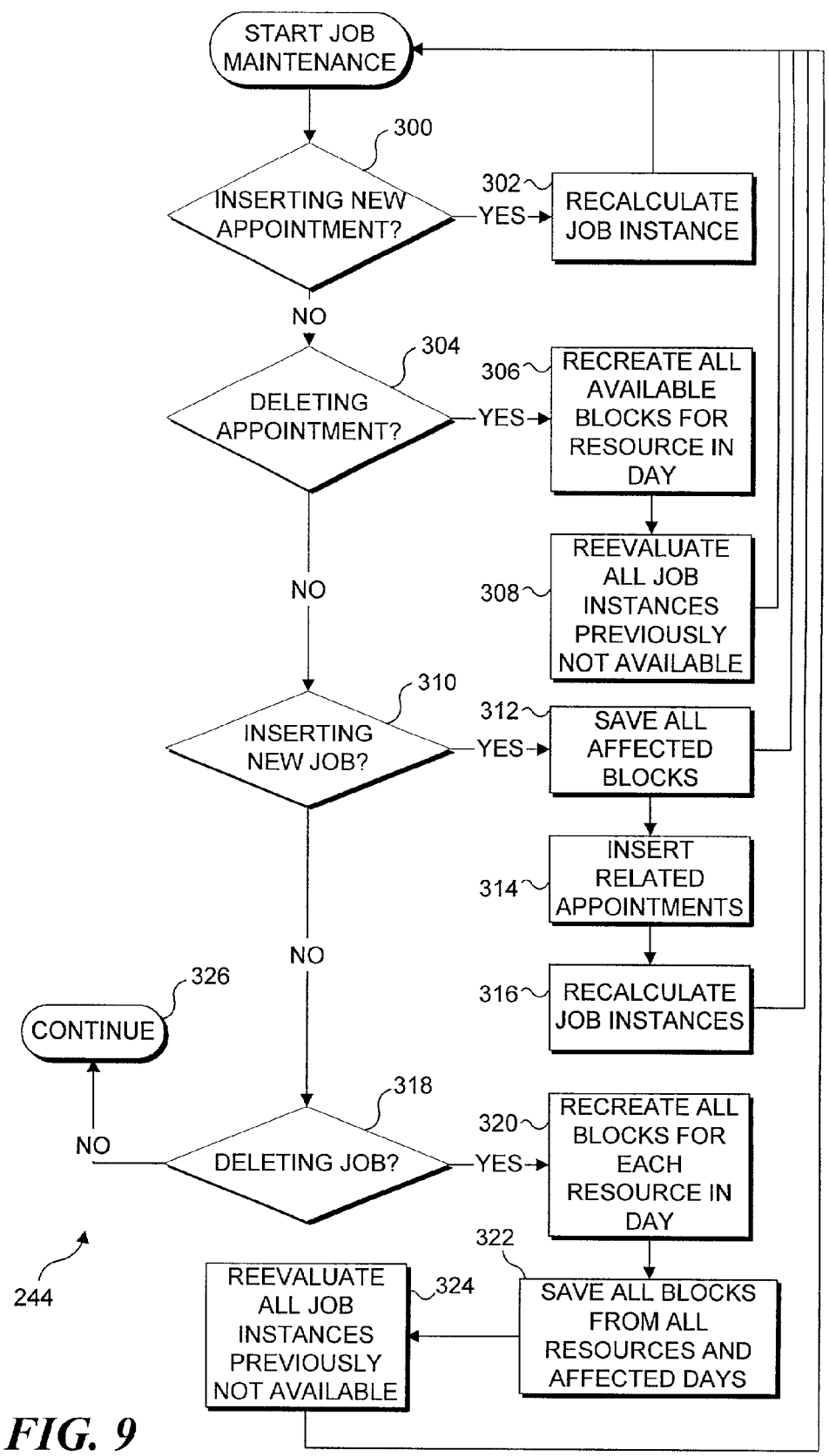
FIG. 9 is a flowchart showing details of the logical steps implemented by the present invention to enable maintenance and modification of the data for a job.

In FIG. 9, details of the steps that can be carried out in performing job maintenance are illustrated. In a decision step 300, the program determines if a new appointment is being inserted, and if so, a step 302 provides for recalculating the job instance associated with the new appointment. When a new appointment is inserted, it is done at the time block level. Thus, when a time block is updated (truncated or deleted), it is necessary to recalculate all job instances associated with the time block ID. Typically, there will be one time block per resource for each job instance, and typically only one to two job instances need to be recalculated. The recalculation of job instances thus produces a new set of proposals for the job. The logic then loops back to the start of the job maintenance. If a new appointment is not being inserted, the logic then determines in a decision step 304 whether the user is deleting an appointment. If so, a step 306 provides for recreating all available time blocks for the resources associated with the appointment that was being deleted during the schedule domain (e.g., during the day). In this step, all job instances that were using this set of time blocks need to be recalculated (i.e., remapped to other time block IDs). It is also contemplated that instead of recalculating all job instances using this set of time blocks, the effect of deleting an appointment can be carried out by considering only the surrounding time blocks, of which there are typically only one or two. In this way, it is possible to reduce the amount of time blocks that need to be recreated and the job instances that need to be recalculated.

In addition to recreating the time blocks, it is also necessary to reevaluate all job instances that were previously unavailable because a resource that was used in the appointment just deleted was busy for the particular time block in question. In calculating the availability of a resource for jobs, it will be recalled that all job instances that could not be used because a resource was unavailable are recorded in connection with the time block and service for which a proposal was not created. Accordingly, when an appointment is deleted, after recreating all of the available time blocks for the resource, all job instances that failed when the appointment that was just deleted was made, must be recalculated, as noted in a step 308. Thereafter, the logic again loops back to the start of the job maintenance procedure.

If the determination in decision step 304 was negative, a decision step 310 determines if the user is inserting a new job. If a new job is being inserted, the software program must insert N appointments in one transaction. Accordingly, a step 312 provides for saving all affected time blocks that would be influenced in this transaction. Next, in a step 314, the resource-times related to the new job are inserted as proposals. This step is followed by a step 316, in which the job instances are recalculated. The logic then returns to the start job maintenance step.

Finally, if the response to decision step 310 is negative, a decision step 318 determines if the user is deleting a job. If so, this step corresponds to deleting a plurality of appointments. Accordingly, a step 320 recreates all time blocks for each resource on the schedule domain day (e.g., the day) in which each of the plurality of appointments was deleted. This step is done for the entire schedule domain, not at a single time block level. Note that it is necessary to save all time blocks from all the resources and affected days that are influenced by the deletion of the job, as provided in a step 322. Finally, all job instances that were previously not available because resources were required for appointments made to carry out the job that has just been deleted are reevaluated in a step 324. The logic then returns to the start of the job maintenance procedure. In the event that no maintenance is being done, which results from a negative response to decision step 318, a step 326 provides for continuing with job maintenance or returning to the appointment manager program.

Figure 10:
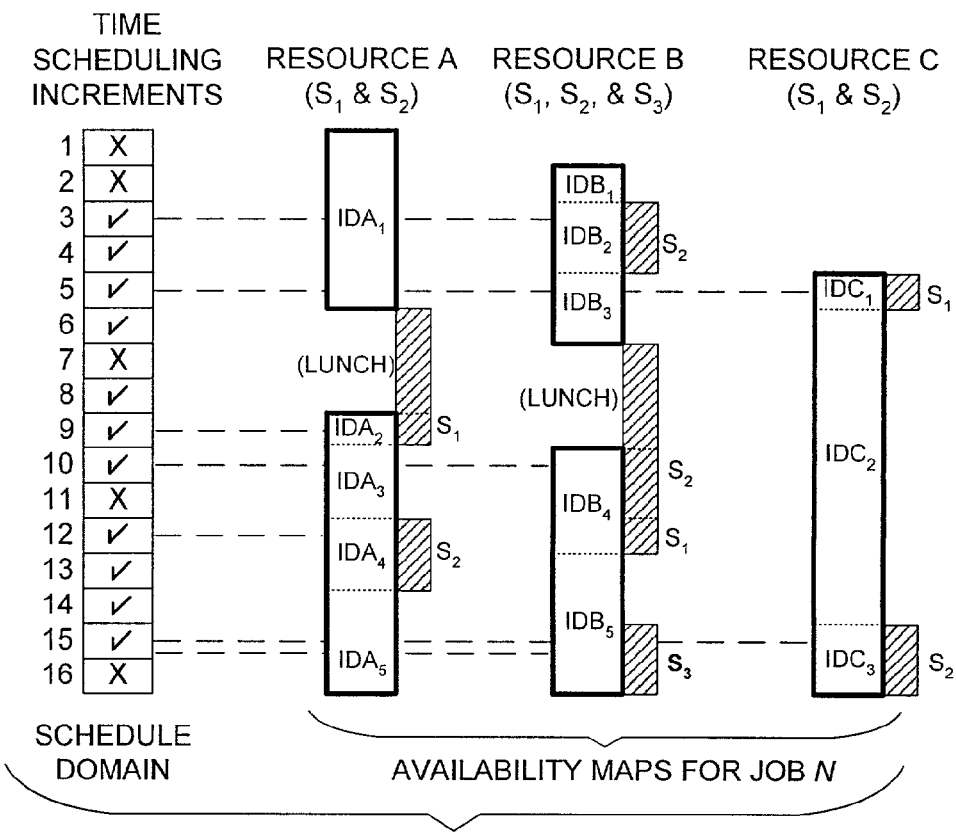
FIG. 10 is a schematic block diagram showing the time blocks associated with resources that may be employed in doing a job.

FIG. 10 illustrates the time blocks comprising the availability maps for a job N that requires three services $S_1$, $S_2$, and $S_3$ to be done. Resources A and C are able to do services $S_1$ and $S_2$, while a resource B is able to all three services. The job requires that services $S_2$ and $S_1$ be done sequentially in either order. Service $S_3$ is shown in bold font to indicate that it is in a CRAB time block, i.e., that it can only be done during time increments 15 and 16 by resource B. The schedule domain is divided into equal intervals 1-16 in this example, and each increment designated as a potential job start time is indicated by a check mark, while those that are not available are indicated with an "X." Each time block for a given resource is initially indicated with identification, e.g., $IDA_1$ and $IDA_2$, and additional time block identifications are added as appointments are made from proposals in which the resources are employed, converting the availability block from a LRAB to a RUB. Each RUB for a resource is indicated by the time blocks filled with slant lines. When an appointment is made, the resource-task-time for service done for the job is associated with the appointment and retained in the data for the job associated with a customer identification. In FIG. 10, the service (task) that has been associated with an appointment is indicated for a resource to the side of the time block for the RUB. Thus, for the job start time at time increment 3, for resource B, service $S_2$ is identified to the side of the first RUB. When this appointment is made, the initial time block that was previously available for resource B is split, creating an identification $IDB_2$ for the new RUB time block and an identification $IDB_3$ for the available time block that follows the RUB of the appointment. Each successive appointment is associated with an existing or new identification for the time block in which the service provided by the resource is made. The availability map for a resource thereby indicates the current status of the resource in terms of appointments that have been made to do the services of which the resource is capable, any times that the resource is otherwise not available (such as being away from the business or at lunch), and the remaining time blocks in which the resource is still available to perform services at the time blocks for which proposals have been created for the job start times indicated in the scheduling increments.

When a resource is defined, the provider can create a template for the resource that is specific for a particular schedule domain, such as specific day of the week. FIG. 11A shows an initial template for resource A that includes time blocks $IDA_1$ and $IDA_2$, and a RUB for the lunch break taken by resource A. In FIG. 11B, time block $IDA_2$ has been allocated to a service that is done by resource A in connection with an appointment to do a job, and a new identification for the time block $IDA_3$ that follows the appointment for this service is indicated. Next, when another appointment is made that uses a proposal for a service $S_2$ at a time block $IDA_4$, a new time block $IDA_5$ is created following the service time block.

FIG. 12 schematically the proposals (i.e., the resource-task-times) that have initially been created at different job start times, $ST_1$, $ST_2$, $ST_3$, $ST_6$, $ST_7$, $ST_8$, and $ST_9$, for resource A to do services 1, 3, and 4. Note that the proposals for services 1 and 3 initially have overlapping durations, since none of these proposals has yet been accepted to make an appointment for a job. Once an appointment is made that uses one of the proposals, the conflicting proposals will no longer be shown as available. When making appointments using any of the proposals for resource A, the software program will, if desired, try to load balance with other resources that can perform the required services for a job, so that the load is distributed among the various resources as appointments are made. In addition, the priority of a resource can also optionally be considered in making appointments, so that the resources having lower priorities are scheduled first before those with higher priorities.

FIG. 13 illustrates CRAB services 1 and 2 that can only be performed at a specific job start times $ST_3$ and $ST_8$, respectively, and a block of LRAB services 3 and 4 that can be performed at any job start time within the block. In this example, a service $S_3$ has been scheduled in an appointment at a start time that overlaps constrained service 1, making it unavailable. Similarly, constrained service 2 has been scheduled as part of an appointment and causes a RUB for services 3 and 4 between start times $ST_8$ and $ST_{11}$.

In FIG. 14A, an appointment for a Job1, associated with a customer identification, $CUST\_ID_1$ is schematically illustrated. This job requires that a service $S_2$ be done, followed sequentially by a service $S_4$. As shown, the job start time is $ST_2$, associated with a time block $IDB_3$ for a resource B, and once this service is completed, service $S_4$ is done by resource A, beginning at a time block $IDA_4$. In contrast, FIG. 14B schematically illustrates a Job2 that requires a service $S_2$ be done in parallel with a service $S_5$, and followed sequentially by a service $S_1$. The job start time is $ST_3$ for time blocks $IDC_2$ and $IDA_2$, corresponding to services $S_2$ and $S_5$, which are respectively performed by resources C and A. Service $S_1$ is then performed after service $S_2$, at a start time $ST_6$, for a time block $IDB_3$ associated with a resource B.

While not currently implemented, it is contemplated that the present invention can be employed to develop proposals for jobs that extend over more than one day, i.e., for schedule domain that is longer than a day. To enable the present invention to create proposals for such jobs, it will be necessary to split the time blocks associated with a service between days, so that a portion of a service for a job can be done on one day, and another on the following one or more days. Also, it may not be necessary to split services between days in this manner, if one or more services required to do the job are completed on one day, and the other one or more services required for the job are completed on a following day. It is further contemplated that jobs can be inserted, by using the time block availability maps that have been created to produce proposals for a new job on the fly. An appointment for the new job can then be readily scheduled without incurring any significant delay.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. In a computer network that includes a scheduling server computer, a plurality of business computing systems logically connectable to the scheduling server computer, and a plurality of customer computing systems logically connectable to the scheduling server computer, a method of configuring the scheduling server computer so that it may be used by any of a plurality of the business computing systems for different types of business entities for scheduling appointments to do a particular job as configured by an operator at any of the business computing systems, the method comprising the steps for:

(a) receiving at the scheduling server computer operator input from any of the business computing systems of the different types of business entities, the operator input comprising data that identifies for a particular business entity one or more services provided by that business, data that identifies a time dependency of each service needed to perform a particular job, and data that identifies a resource dependency of each service needed to perform each job, and wherein the time dependency comprises a length of time required to perform the service, and when the service depends on the prior performance of other related services, the time dependency includes a length of time for performing those prior related services, and wherein at least some services needed to perform the particular job must be carried out either sequentially or in parallel;

the resource dependency comprises a listing of the resources required to perform the service;

(b) receiving at the scheduling server computer operator input from any of the business computing systems for the different types of business entities, the operator input comprising data that identifies for said particular business entity a time availability of each resource that can be used to perform each service needed to perform each job;

(c) the scheduling server computer thereafter using the data input from said operator to automatically create for each particular business entity which has input data for configuring the scheduling of its jobs, a plurality of proposals for each business entity that specify when each job as configured by the operator for each business entity might be scheduled during a defined time period, the plurality of proposals being created as a function of the time availability of each resource that can be used to perform each service needed to perform each job and the time dependency of each service, and wherein at least one resource and at least one service can be included in any number of the plurality of proposals at a same time availability, each proposal indicating a time instance at which each job can be initiated during the defined time period, and wherein each job can be have a plurality of associated proposals;

(d) after the plurality of proposals for each business entity have been created by the scheduling server computer, either a business computing system or a customer computing system logging onto the scheduling server computer and inputting data which identifies a desired time for starting an appointment to do a particular job by a particular business entity;

(e) based upon the input data identifying the desired time for starting the appointment to do the particular job by the particular business entity, the scheduling server computer automatically selecting one of the plurality of proposals that are associated with the particular job in order to use the selected proposal to make an appointment for doing the particular job by the particular business entity;

(f) the scheduling server computer then automatically associating the corresponding resources required for the selected proposal with the appointment and then tagging the resources so that thereafter they are identified as being unavailable for other proposals used by the particular business entity; and (g) the scheduling computer then automatically revising one or more other proposals in response to said selected proposal used to make said appointment for doing the particular job at the particular business entity, the revising of the one or more other proposals including, revising the one or more other proposals so as to remove from the one or more other proposals any of the tagged resources no longer available due to making the appointment for doing the particular job at the particular business entity, and eliminating any of the one or more other proposals which cannot be revised due to the tagged resources no longer being available.

2. The method of claim 1, further comprising a step for associating the selected proposal with a customer for whom the job is to be done.

3. The method of claim 1, wherein the step for automatically creating the plurality of proposals comprises a steps for automatically searching each of the services needed to perform the job to identify an availability of each block of time that is:

(a) sufficient in duration to perform the service; and
(b) for which resources required to perform the service are available.

4. The method of claim 3, further comprising a step for associating a job identification with each block of time that is thus identified.

5. The method of claim 3, further comprising a step for splitting a block of time into pieces, to define a proposal having a split time interval in which the job can be performed.

6. The method of claim 1, further comprising a step for receiving operator input assigning different priorities to at least some of the resources, so that a resource assigned a lower priority is used prior to a resource assigned a higher priority, when selecting said one of the plurality of proposals to schedule the appointment.

7. The method of claim 1, wherein the step for receiving operator input comprising data that identifies for said particular business a time availability of each resource includes a step for specifying any block of time in which a resource is unavailable to perform a service during the defined time period.

8. The method of claim 1, wherein the step for automatically selecting one of the plurality of proposals that are associated with the particular job comprises a step for balancing usage of the resources that can be used to perform the services needed to perform the job.

9. The method of claim 1, further comprising a step for receiving input from an operator at a business computing system or from a customer at a customer computing system instructing an appointment to be cancelled, and in response thereto, the scheduling server computer automatically revising the plurality of proposals, to accommodate changes in the time availability of resources that were previously required to perform said one of the plurality of proposals corresponding to the appointment that was canceled, making the resources available for other appointments.

10. In a computer network that includes a scheduling server computer, a plurality of business computing systems logically connectable to the scheduling server computer, and a plurality of customer computing systems logically connectable to the scheduling server computer, a computer program product comprising a computer-readable storage media storing computer executable instructions that when executed perform a method of configuring the scheduling server computer so that it may be used by any of a plurality of the business computing systems for different types of business entities for scheduling appointments to do a particular job as configured by an operator at any of the business computing systems, and wherein the method is comprised of steps for:

(a) receiving at the scheduling server computer operator input from any of the business computing systems of the different types of business entities, the operator input comprising data that identifies for a particular business entity one or more services provided by that business, data that identifies a time dependency of each service needed to perform a particular job, and data that identifies a resource dependency of each service needed to perform each job, and wherein the time dependency comprises a length of time required to perform the service, and when the service depends on the prior performance of other related services, the time dependency includes a length of time for performing those prior related services, and wherein at least some services needed to perform the particular job must be carried out either sequentially or in parallel;

the resource dependency comprises a listing of the resources required to perform the service;

(b) receiving at the scheduling server computer operator input from any of the business computing systems for the different types of business entities, the operator input comprising data that identifies for said particular business entity a time availability of each resource that can be used to perform each service needed to perform each job;

(c) the scheduling server computer thereafter using the data input from said operator to automatically create for each particular business entity which has input data for configuring the scheduling of its jobs, a plurality of proposals for each business entity that specify when each job as configured by the operator for each business entity might be scheduled during a defined time period, the plurality of proposals being created as a function of the time availability of each resource that can be used to perform each service needed to perform each job and the time dependency of each service, and wherein at least one resource and at least one service can be included in any number of the plurality of proposals at a same time availability, each proposal indicating a time instance at which each job can be initiated during the defined time period, and wherein each job can be have a plurality of associated proposals;

(d) after the plurality of proposals for each business entity have been created by the scheduling server computer, either a business computing system or a customer computing system logging onto the scheduling server computer and inputting data which identifies a desired time for starting an appointment to do a particular job by a particular business entity;

(e) based upon the input data identifying the desired time for starting the appointment to do the particular job by the particular business entity, the scheduling server computer automatically selecting one of the plurality of proposals that are associated with the particular job in order to use the selected proposal to make an appointment for doing the particular job by the particular business entity;

(f) the scheduling server computer then automatically associating the corresponding resources required for the selected proposal with the appointment and then tagging the resources so that thereafter they are identified as being unavailable for other proposals used by the particular business entity; and (g) the scheduling computer then automatically revising one or more other proposals in response to said selected proposal used to make said appointment for doing the particular job at the particular business entity, the revising of the one or more other proposals including, revising the one or more other proposals so as to remove from the one or more other proposals any of the tagged resources no longer available due to making the appointment for doing the particular job at the particular business entity, and eliminating any of the one or more other proposals which cannot be revised due to the tagged resources no longer being available.

* * * * *

UNITED STATES PATENT AND TRADEMARK OFFICE
CERTIFICATE OF CORRECTION

| | | |
|---|---|---|
| PATENT NO. | : 7,502,747 B1 | Page 1 of 1 |
| APPLICATION NO. | : 09/997616 | |
| DATED | : March 10, 2009 | |
| INVENTOR(S) | : Ehud Pardo et al. | |

It is certified that error appears in the above-identified patent and that said Letters Patent is hereby corrected as shown below:

In the Claims:

In column 19, line 15, in Claim 3, delete "steps" and insert -- step --, therefor.

Signed and Sealed this
Nineteenth Day of April, 2011

David J. Kappos
*Director of the United States Patent and Trademark Office*